(12) United States Patent
Wijnands et al.

(10) Patent No.: US 9,363,227 B2
(45) Date of Patent: Jun. 7, 2016

(54) MULTICAST SOURCE IN GROUP ADDRESS MAPPING

(75) Inventors: Ijsbrand Wijnands, Leuven (BE); Gregory J. Shepherd, Eugene, OR (US)

(73) Assignee: Cisco Technology, Inc., San Jose, CA (US)

( * ) Notice: Subject to any disclaimer, the term of this patent is extended or adjusted under 35 U.S.C. 154(b) by 422 days.

(21) Appl. No.: 13/588,129

(22) Filed: Aug. 17, 2012

(65) Prior Publication Data

US 2014/0052831 A1 Feb. 20, 2014

(51) Int. Cl.
*G06F 15/177* (2006.01)
*H04L 29/12* (2006.01)
*H04L 12/761* (2013.01)
*H04L 12/18* (2006.01)

(52) U.S. Cl.
CPC ............... *H04L 61/25* (2013.01); *H04L 12/18* (2013.01); *H04L 12/185* (2013.01); *H04L 12/1854* (2013.01); *H04L 45/16* (2013.01); *H04L 61/6004* (2013.01)

(58) Field of Classification Search
None
See application file for complete search history.

(56) References Cited

U.S. PATENT DOCUMENTS

| | | | |
|---|---|---|---|
| 5,959,989 A | 9/1999 | Gleeson et al. | 370/392 |
| 6,182,147 B1 | 1/2001 | Farinacci | 709/238 |
| 6,317,434 B1 | 11/2001 | Deng | 370/432 |
| 6,331,983 B1 | 12/2001 | Haggerty et al. | 370/400 |
| 6,457,059 B1 | 9/2002 | Kobayashi | 709/242 |
| 6,597,703 B1 | 7/2003 | Li et al. | 370/428 |
| 6,631,420 B1 | 10/2003 | Li et al. | 709/242 |
| 6,633,765 B1 | 10/2003 | Maggenti et al. | 455/503 |
| 6,654,371 B1 | 11/2003 | Dunstan et al. | 370/390 |
| 6,711,172 B1 | 3/2004 | Li | 370/401 |
| 6,757,843 B1 | 6/2004 | Wesley et al. | 714/18 |
| 6,853,639 B1 | 2/2005 | Watanuki et al. | 370/390 |
| 6,947,440 B2 | 9/2005 | Chatterjee et al. | 370/390 |
| 6,963,573 B1 | 11/2005 | Cain et al. | 370/401 |

(Continued)

FOREIGN PATENT DOCUMENTS

| | | | | |
|---|---|---|---|---|
| AU | 2003 257074 | 7/2002 | | H04L 12/18 |
| CN | ZL 03 8 18291.2 | 7/2003 | | H04L 12/18 |

(Continued)

OTHER PUBLICATIONS

Xiao et. al Internet Protocol Television (IPTV): The Killer Application for the Next Generation Internet (IEEE Communications Magazine, Nov. 2007, pp. 126-134).*

(Continued)

*Primary Examiner* — Ranodhi Serrao
*Assistant Examiner* — James Fiorillo
(74) *Attorney, Agent, or Firm* — Campbell Stephenson LLP

(57) ABSTRACT

The present disclosure provides a source specific multicast service that maps multicast group addresses to corresponding source addresses. A boundary routing element can be configured to determine whether a received join request includes a mapped group address. If the join request does not include a mapped group address, boundary routing element can be configured to perform normal join request processing of the join request. If the join request includes a mapped group address, the boundary routing element can be configured to generate a corresponding source address using the mapped group address. The boundary routing element can also be configured to perform alternative join request processing as if the join request were an SSM join request that specified both a source address and a multicast group address.

18 Claims, 8 Drawing Sheets

(56) References Cited

U.S. PATENT DOCUMENTS

| | | | |
|---|---|---|---|
| 6,970,461 B2 | 11/2005 | Unitt et al. | 370/390 |
| 6,988,146 B1 | 1/2006 | Magret et al. | 709/238 |
| 7,012,891 B1 | 3/2006 | Chandran et al. | 370/230 |
| 7,061,880 B2 | 6/2006 | Basilier | 370/312 |
| 7,233,987 B2 | 6/2007 | Watkinson | 709/223 |
| 7,310,335 B1 | 12/2007 | Garcia-Luna-Aceves et al. | 370/390 |
| 7,418,003 B1 | 8/2008 | Alvarez et al. | 370/432 |
| 7,486,611 B1 | 2/2009 | Wilson | 370/220 |
| 7,502,372 B2 | 3/2009 | Tsuchiya et al. | 370/390 |
| 7,835,276 B2* | 11/2010 | Naik | H04L 12/1428 370/230 |
| 7,852,841 B2* | 12/2010 | Wijnands | H04L 12/185 370/390 |
| 7,933,268 B1* | 4/2011 | Melman | H04L 12/18 370/245 |
| 8,111,702 B1* | 2/2012 | Wijnands | H04L 45/48 370/256 |
| 8,576,844 B1* | 11/2013 | Ghosh | H04L 12/462 370/390 |
| 8,675,478 B2* | 3/2014 | Asati | H04L 12/185 370/225 |
| 2002/0091926 A1 | 7/2002 | Fukutomi | 713/170 |
| 2002/0191584 A1 | 12/2002 | Korus et al. | 370/349 |
| 2003/0035398 A1 | 2/2003 | Sato | 370/338 |
| 2003/0112799 A1 | 6/2003 | Chandra et al. | 370/389 |
| 2004/0022244 A1 | 2/2004 | Boers et al. | 370/390 |
| 2004/0100983 A1* | 5/2004 | Suzuki | H04L 12/185 370/432 |
| 2004/0122890 A1 | 6/2004 | Watkinson | 709/203 |
| 2004/0205215 A1 | 10/2004 | Kouvelas et al. | 709/231 |
| 2005/0007969 A1 | 1/2005 | Hundscheidt | 370/312 |
| 2005/0076207 A1 | 4/2005 | Park et al. | 713/163 |
| 2006/0062220 A1 | 3/2006 | Suga | 370/392 |
| 2006/0072572 A1* | 4/2006 | Ikeda | H04L 12/18 370/390 |
| 2006/0088031 A1 | 4/2006 | Nalawade | 370/390 |
| 2006/0133375 A1 | 6/2006 | Napierala | 370/390 |
| 2006/0146857 A1* | 7/2006 | Naik | H04L 12/1428 370/432 |
| 2006/0159091 A1 | 7/2006 | Boers et al. | 370/390 |
| 2006/0159092 A1 | 7/2006 | Boers et al. | 370/321 |
| 2006/0221960 A1* | 10/2006 | Borgione | H04L 12/18 370/390 |
| 2007/0070946 A1* | 3/2007 | Dorenbosch | H04L 12/185 370/331 |
| 2007/0091827 A1* | 4/2007 | Boers | H04L 12/185 370/255 |
| 2007/0121574 A1* | 5/2007 | Igarashi | H04L 12/185 370/351 |
| 2007/0201391 A1* | 8/2007 | Belmonte | H04M 1/72541 370/312 |
| 2008/0072035 A1* | 3/2008 | Johnson | H04L 63/0428 713/153 |
| 2009/0161594 A1* | 6/2009 | Zhu | H04L 12/18 370/312 |
| 2009/0187941 A1* | 7/2009 | Smith | H04L 12/1854 725/35 |
| 2010/0049860 A1* | 2/2010 | Kouvelas | H04L 12/18 709/230 |
| 2011/0274107 A1* | 11/2011 | Lessard | H04L 45/16 370/390 |
| 2012/0106429 A1* | 5/2012 | Hong | H04W 48/10 370/312 |

FOREIGN PATENT DOCUMENTS

| | | | |
|---|---|---|---|
| EP | 07122045.3 | 11/2007 | H04L 12/18 |
| WO | WO 00/051370 A1 | 8/2000 | |
| WO | WO 02/45334 A1 | 6/2002 | |
| WO | WO 2004/012390 A1 | 2/2004 | H04L 12/18 |

OTHER PUBLICATIONS

S. Deering, "RFC1112—Host Extensions for IP Multicasting," Internet RFC/STD/FYI/BCP Archives, Aug. 1989, pp. 1-13, http://www.faqs.org/rfcs/rfc1112.html.

"Stephen's Multicast Study: Protocol Independent Multicast (PIM)," NIST/ITL Advanced Network Technologies Division Software Distribution, Jun. 14, 1998, pp. 1-8, http://dns.antd.nist.gov/snad-staff/night/multicast/multpim.html.

"Source Specific Multicast (SSM) Homepage," Cisco IOS Software—IP Multicast Development & Dev/Test Groups, Nov. 29, 2000, pp. 1-6, ftp://ftpeng.cisco.com/ipmulticast/ssm/index.html.

H. Holbrook and B. Cain, "Source-Specific Multicast for IP," Internet Engineering Task Force (IETF), Nov. 21, 2001, pp. 1-14, http://www.ietf.org/internet-drafts/draft-ietf-ssm-arch-00.txt.

B. Haberman, "IGMPv3 and Multicast Routing Protocol Interaction," Internet Engineering Task Force (IETF), Feb. 2002, pp. 1-5, http://www.ietf.org/internet-drafts/draft-ietf-magma-igmpv3-and-routing-02.txt.

Supratik Bhattacharyya et al., "An Overview of Source-Specific Multicast (SSM)," Internet Engineering Task Force (IETF), Mar. 4, 2002, pp. 1-13, http://www.ietf.org/internet-drafts/draft-ietf-ssm-overview-03.txt.

IP Multicast Technology Overview, Cisco Systems, Inc., Apr. 18, 2002, pp. 1-24, http://www.cisco.com/univercd/cc/td/doc/cisintwk/intsolns/mcst_sol/mcst_ovr.htm.

Brad Cain et al., "Internet Group Management Protocol, Version 3," Internet Engineering Task Force (IETF), May 2002, pp. 1-38.

Holbrook, Hugh W. and Cheriton, David R., "IP Multicast Channels: Express Support for Large-Scale Single-Source Applications," Computer Communications Review, Association for Computing Machinery, vol. 29, No. 4, Oct. 1999, pp. 65-78.

"Multicast Routing on the Internet," Multicast Communication, Protocols and Applications, May 12, 2000, pp. 105-121.

Int'l. Search Report as mailed from the PCT on Nov. 28, 2003 for counterpart WO Application (PCT/US03/23944; Filed Jul. 31, 2003), 7 pages.

Estrin, et al., "Protocol Independent Multicast-Sparse Mode (PIM-SM): Protocol Specification", Internet Draft of the IETF, Sep. 9, 1997, pp. 1-51.

Li et al., RFC_2281 (Cisco Hot Standby Router Protocol, dated Mar. 1998, all pages).

"Configuring SSM Mapping," http://www.juniper.net/techpubs/software/erx/junose53/swconfig-routing-vol1/html/ip_mul..., Sep. 30, 2004, pp. 1-2.

https://www.juniper.net/products/junose/105017.html, Software Release 5.3: New Features List, Juniper Networks, Inc., 1998-2004, pp. 1-16.

* cited by examiner

Prefix List
155

Designated Prefix 315

Entry 310(1)      232.0.0.0\8

Entry 310(2)      234.0.0.0\8

Entry 310(3)      W.0.0.0\8

*FIG. 3*

Selector Table
165(1)

| | Group Address Selector Octet 410 | Source Address Higher Order Octet 420 |
|---|---|---|
| Entry 400(1) | 232 | Z |
| Entry 400(2) | 234 | Y |
| Entry 400(3) | W | X |

*FIG. 4A*

Selector Table
165(2)

| | Group Address Selector Octet 440 | Source Address Higher Order Octets 450 |
|---|---|---|
| Entry 430(1) | a | Y.Z |
| Entry 430(2) | b | X.Y |
| Entry 430(3) | c | Z.X |

*FIG. 4B*

MULTICAST SOURCE IN GROUP ADDRESS MAPPING

TECHNICAL FIELD

The present disclosure relates generally to Internet protocols and, more particularly, to mapping a multicast group address to a source address.

BACKGROUND

Multicast is often the preferred method of communication for many common network distribution applications. This is so because multicast is a bandwidth-conserving technology that reduces traffic by simultaneously delivering data to multiple hosts, or receivers. Once receivers have joined a multicast group, a server or source responsible for sending content need only send the content to the multicast group address, rather than sending the content to each individual receiver or to all receivers on the network.

BRIEF DESCRIPTION OF THE DRAWINGS

A more complete understanding of the present disclosure may be acquired by referring to the following description and accompanying drawings, in which like references numbers indicate like features.

FIG. 3 is a block diagram illustrating elements of an example prefix list configured on a boundary routing element, according to one embodiment.

FIGS. 4A and 4B are block diagrams illustrating elements of an example selector table configured on a boundary routing element, according to one embodiment.

Figure 1:
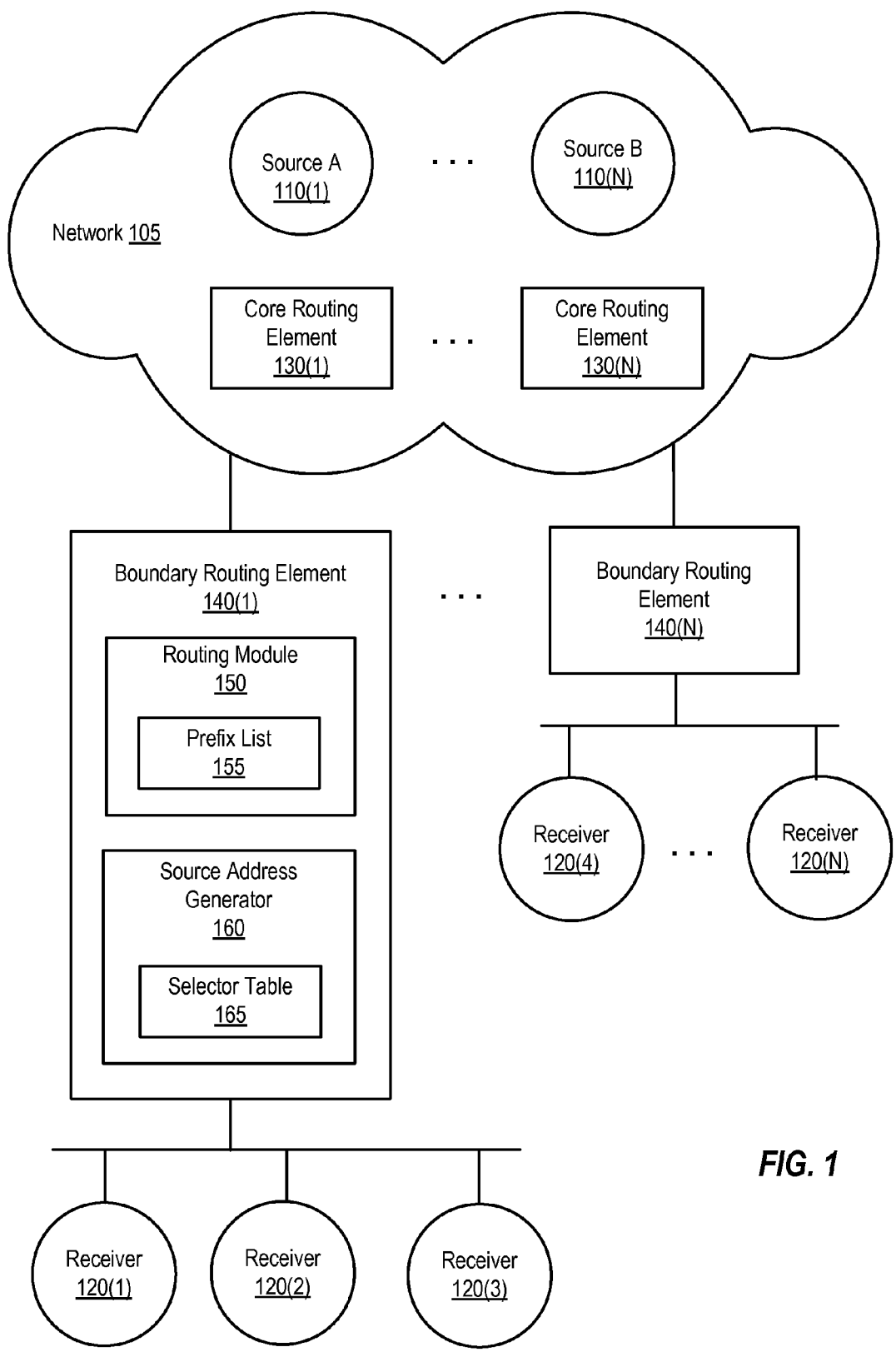
FIG. 1 is a block diagram illustrating components of an example network in which the present disclosure can be implemented, according to one embodiment.

While the present disclosure is susceptible to various modifications and alternative forms, specific embodiments of the present disclosure are provided as examples in the drawings and detailed description. It should be understood that the drawings and detailed description are not intended to limit the present disclosure to the particular form disclosed. Instead, the intention is to cover all modifications, equivalents and alternative falling within the spirit and scope of the present disclosure as defined by the appended claims.

DETAILED DESCRIPTION

Overview

In a network that implements source-specific multicast (SSM), multiple sources (e.g., servers, or host or client computers) can be configured to provide different content (e.g., audio and/or video data) as a datastream of multicast packets to multicast groups of receivers (e.g., host or client computers). A receiver wishing to receive a datastream from a particular source needs to specify, in a join request, both a multicast group address G of the multicast group that the receiver wishes to join and a source address S of a particular source that provides the content that the receiver wishes to receive. The source address and multicast group address of such an SSM join request can be expressed as the tuple (S, G), which uniquely identifies the particular channel, or a particular datastream of content provided by a source to a multicast group address, that the receiver wishes to receive. Source and group addresses used in the network can be arbitrarily allocated by a network provider. The receiver can send the SSM join request to a next hop router, such as a boundary router that is adjacent to the requesting receiver and to the network. The boundary router can process the SSM join request, such as by propagating a corresponding PIM join message through the network. In response, a packet transport tree (e.g., a multicast tree) or a branch thereof is built in the network between the particular source and the receiver that sent the join request. Packets of the datastream can then be transported on the tree from the particular source to the requesting receiver.

However, receivers that wish to receive content from a source in the provider network may not be configured to communicate with an SSM-compliant provider network. For example, a receiver may lack the ability to specify a source address in a join request (e.g., the receiver is not configured with IGMPv3 and thus lacks the ability to specify a source address in an IGMPv3 membership report) or may not know the source address (e.g., the receiver does not support source discovery).

The present disclosure provides an SSM service that maps multicast group addresses to corresponding source addresses, where multicast group addresses and corresponding source addresses are efficiently allocated in the network to share one or more of the same octet values. A boundary routing element can be configured to determine whether a received join request includes a mapped group address, where a mapped group address can be used to generate a corresponding source address. If the join request does not include a mapped group address, the boundary routing element can be configured to perform normal join request processing of the join request.

If the join request includes a mapped group address, the boundary routing element can be configured to generate a corresponding source address using the mapped group address, according to an octet assignment configured on the boundary routing element. For example, an octet assignment can provide that the corresponding source address is generated by combining one or more octets of the mapped group address with one or more pre-configured octet values. The boundary routing element can also be configured to perform alternative join request processing as if the join request were an SSM join request that specified both a source address and a multicast group address. Thus, a receiver can subscribe to a particular channel, or a datastream provided by a particular source (which corresponds to the generated source address) to a multicast group address, without specifying the source address of the particular source providing the datastream (e.g., without being configured to support SSM).

A boundary routing element implementing the present disclosure can thus process join requests from receivers that are variously configured, such as processing incoming join requests that include a mapped group address in one manner (e.g., source address generation for IGMPv1 or IGMPv2 membership reports), and processing incoming join requests that do not include a mapped group address in another manner (e.g., normal join request processing for IGMPv3 membership reports that include both a source address and a multicast group address). Core routing elements in the network need not be differently configured. The present disclosure can especially benefit walled-garden deployments, where the network provider provides particular services or applications to receivers via the network such as IPTV (Internet Protocol television), which does not support SSM.

Example Embodiments

FIG. 1 is a block diagram illustrating components of an example network 105 in which the present disclosure can be implemented. Network 105 communicatively couples multicast sources 110(1)-(N), core routing elements 130(1)-(N), and boundary routing elements 140(1)-(N). Multicast sources 110(1)-(N) are communicatively coupled to receivers 120(1)-(N) via core routing elements 130(1)-(N) and boundary routing elements 140(1)-(N). In the embodiment shown, boundary routing element 140(1) is communicatively coupled to receivers 120(1)-(3) and boundary routing element 140(N) is communicatively coupled to receivers 120(4)-(N). Each component is discussed in further detail below.

Multicast source A 110(1) and source B 110(N) each provide a different datastream, or content that is distributed as multicast packets, to one or more multicast groups. Other sources 110 in the network can provide duplicate datastreams to one or more multicast groups as anycast sources. Sources 110(1)-(N) can each be identified by a source address, such as an IP (Internet Protocol) address. Each multicast group can be identified by a multicast group address, such as an IP address. Each multicast group can include one or more receivers 120(1)-(N), also referred to herein as receiver 120, which are subscribed to the multicast group to receive the content. Sources 110(1)-(N) and receivers 120(1)-(N) can be implemented using, for example, a desktop computer, a laptop computer, a workstation, a server, or the like.

Core routing elements 130(1)-(N), also referred to herein as core routing element 130, are representative of routing elements located within network 105. Core routing elements 130 can be configured to build a packet transport tree, or a branch thereof, in response to receipt of a join request from a receiver. Core routing elements can be configured to consult network routing information in order to build the packet transport tree (e.g., a multicast tree), or branch thereof, across network 105 between source 110 and receiver 120 that sent the join request.

Boundary routing elements 140(1)-(N), also referred to herein as boundary routing element 140, are representative of routing elements located on the edge of network 105. A boundary routing element 140 can be adjacent to, and thus can be a next-hop router for, one or more receivers 120. Boundary routing elements 140 can be configured to receive messages from receivers 120, such as a message indicating a join request from a receiver. An example of a boundary routing element is described subsequently, in connection with FIGS. 7 and 8.

Each boundary routing element 140 can be configured with a routing module 150 and a source address generator 160. Although routing module 150 and source address generator 160 are shown as separate components in FIG. 1, source address generator 160 can be incorporated as a component within routing module 150 in another embodiment.

In response to receipt of a join request from a receiver, routing module 150 can be configured to determine whether a multicast group address of the join request requires source address generation by comparing the multicast group address with a prefix list 155. Prefix list 155 includes one or more designated prefixes, where each prefix identifies a range of group addresses that are mapped to source addresses. A mapped group address can be used to generate a corresponding source address. An example prefix list 155 is illustrated in FIG. 3. If initial bits (e.g., most significant bits) of the multicast group address match a prefix of prefix list 155, then the multicast group address is identified as a mapped group address. In response to the match, routing module 150 can provide the multicast group address to source address generator 160 for generation of a corresponding source address. If the multicast group address does not match any prefix of prefix list 155, then the multicast group address is not identified as a mapped group address, and routing module 150 can perform normal join request processing.

Source address generator 160 can be configured to generate a source address based on the multicast group address of the received join request. Source address generator 160 can be configured to generate a source address by combining one or more pre-configured octet values with one or more octets of the multicast group address. In one embodiment, the one or more pre-configured octet values can be stored in a selector table 165, which uses one or more octets of the multicast group address as a key to select the one or more pre-configured octet values from selector table 165. An example selector table 165 is illustrated in FIGS. 4A and 4B. Source address generator 160 can combine the one or more pre-configured octet values with one or more octets of the multicast group address to produce the source address.

Source address generator 160 can provide the generated source address to routing module 150. Routing module 150 be configured to generate a join message that includes the generated source address and the multicast group address, and to transmit the join message to network 105 (e.g., transmits the join message to a core routing element 130). In response to transmission of the join message, a packet transport tree (or a branch thereof) can be built between the source identified by the generated source address and the receiver that sent the join request. Thus, as provided by the present disclosure, a receiver can subscribe to a channel (where a particular source provides a datastream of content to a multicast group address on a channel), without specifying the source address of the particular source.

An example of network 105 is a local area network (LAN) utilizing Ethernet, IEEE 802.11x, or some other communications protocol. In light of the present disclosure, it will be appreciated that network 105 can include other components such as routers, firewalls and the like that are not germane to the discussion of the present disclosure and will not be discussed further herein. It will also be appreciated that other configurations are possible. For example, a much larger number of sources 110(1)-(N), receivers 120(1)-(N), core routing elements 130(1)-(N), and/or boundary routing elements 140(1)-(N) than the number shown can be implemented in the network, and so on.

The letter N is used to indicate a variable number of devices or components. For example, a variable number of sources 110, core routing elements 130, boundary routing elements 140, and receivers 120 are implemented in the network. Although the letter N is used in describing a variable number of instances of each of these different devices and components, a repeated use of the letter N does not necessarily indicate that each device and component has a same number of N instances implemented in the network.

Figure 2A:
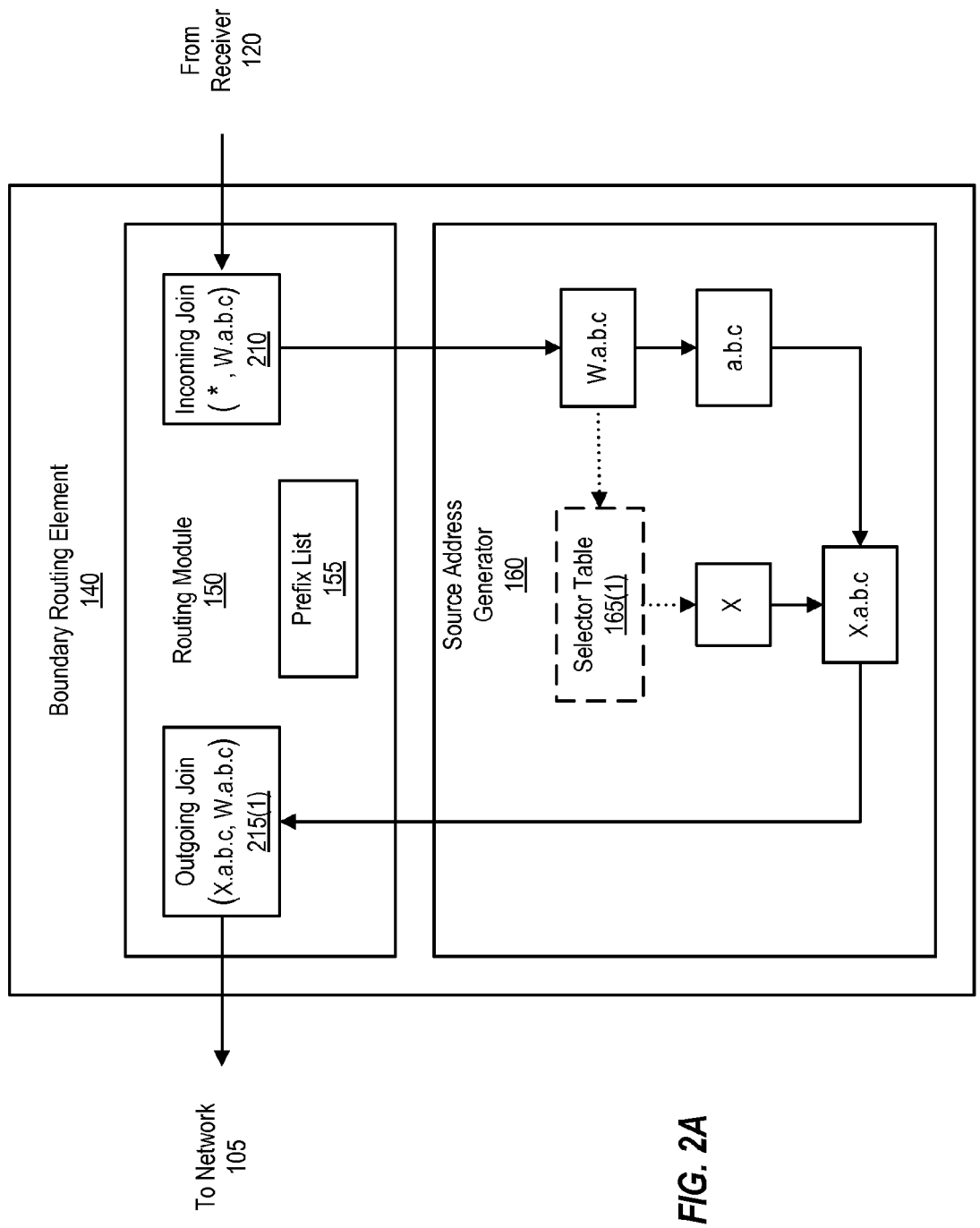
FIGS. 2A and 2B are block diagrams illustrating components of an example boundary routing element in which the present disclosure can be implemented, according to one embodiment.

FIG. 2A is a block diagram illustrating components of an example boundary routing element 140, which can be configured with routing module 150 and source address generator 160. Routing module 150 can be configured to process join requests, and source address generator 160 can be configured to generate source addresses.

Boundary routing element 140 is configured to receive an incoming join request 210 from a receiver, and to forward the incoming join request 210 to routing module 150 (e.g., provide a join message to routing module 150, as further discussed below in reference to FIGS. 7 and 8). An incoming join request can be an IGMP (Internet Group Management Protocol) membership report. The incoming join request can include a multicast group address G, and may not include a source address. If the source address is unspecified, the source address and multicast group address can be expressed as a tuple (*, G), where * is a placeholder that indicates the source address is unspecified.

In the embodiment shown, multicast group address G of the incoming join request is IPv4 address W.a.b.c, where W, a, b, and c each represent an octet value of the multicast group address. In another embodiment, multicast group address G can be an IPv6 address that includes 16 octets. Routing module 150 can be configured to determine whether multicast group address G requires source address generation by comparing multicast group address G to prefix list 155, as discussed in further detail below in reference to FIG. 3.

FIG. 2A illustrates a scenario where multicast group address G matches a prefix in prefix list 155. In response to the match, routing module 150 can be configured to provide multicast group address G to source address generator 160. Source address generator 160 can be configured to use multicast group address G to generate a corresponding source address S. In particular, source address generator 160 can be configured (e.g., by a network provider) to assign one or more pre-configured octet values to one or more higher order octets of source address S, and to assign one or more lower order octets of a group address to one or more lower order octets of source address S. Upon receipt of multicast group address G, source address generator 160 can be configured to combine the pre-configured octet value(s) with octet(s) of G according to the configured octet assignment. In the embodiment shown, source address generator 160 is configured to combine pre-configured octet value X (which is assigned to the highest order octet of source address S) with the three lower order octets of multicast group address G (which are assigned to the three lowest order octets of source address S) to produce a source address S of X.a.b.c.

In one embodiment, source address generator 160 can be configured to combine pre-configured octet value(s) with octet(s) of G by writing the pre-configured octet value(s) (e.g., X) to the assigned highest order octet(s) of a new (null) address, and write the octet(s) of G (e.g., a.b.c) to the assigned lowest order octet(s) of the new address, thus producing a generated source address S (e.g., X.a.b.c). In another embodiment, source address generator 160 can be configured to combine the pre-configured octet value(s) with octet(s) of G by first masking G to produce an intermediate address that includes the lowest order octet(s) of multicast group address G, where the lowest order octet(s) are assigned to the lowest order octet(s) of source address S. For example, G can be masked to produce 0.a.b.c (e.g., by performing a bitwise AND operation of G and a mask of 0.255.255.255). Source address generator 160 can then be configured to replace the highest order octet(s) of the intermediate address with the pre-configured octet value(s) to produce the source address. For example, X can replace the highest order octet, 0, of intermediate address 0.a.b.c (e.g., by writing X into the highest order octet of intermediate address 0.a.b.c, or by performing a bit-wise OR operation of X.0.0.0 and 0.a.b.c) to produce source address X.a.b.c.

In one embodiment, source address generator 160 can be configured to combine a same (e.g., static) pre-configured octet value(s) with octet(s) of every multicast group address G received by source address generator 160. In another embodiment (shown in FIG. 2A in dotted outline), various pre-configured octet value(s) can be stored in entries of selector table 165(1), where higher order octet(s) of multicast group address G can be used to select a particular pre-configured octet value(s) from selector table 165(1). For example, the highest order octet, W, of multicast group address G can be used as a selector to select pre-configured octet value X from selector table 165(1). Selector table 165(1) is further discussed below, in reference to FIG. 4A.

After generating source address S, source address generator 160 can be configured to provide S to routing module 150. Routing module 150 can be configured to generate a corresponding join message 215(1) (e.g., a PIM join message) that includes the tuple (S, G), shown as (X.a.b.c, W.a.b.c) in FIG. 2A, where S is the generated source address and G is the multicast group address of the join request from the receiver. Routing module 150 can be configured to transmit the corresponding join message 215(1) to the network (e.g., transmit join message 215(1) via a port of boundary routing element 140 that is coupled to a core routing element 130).

Figure 2B:
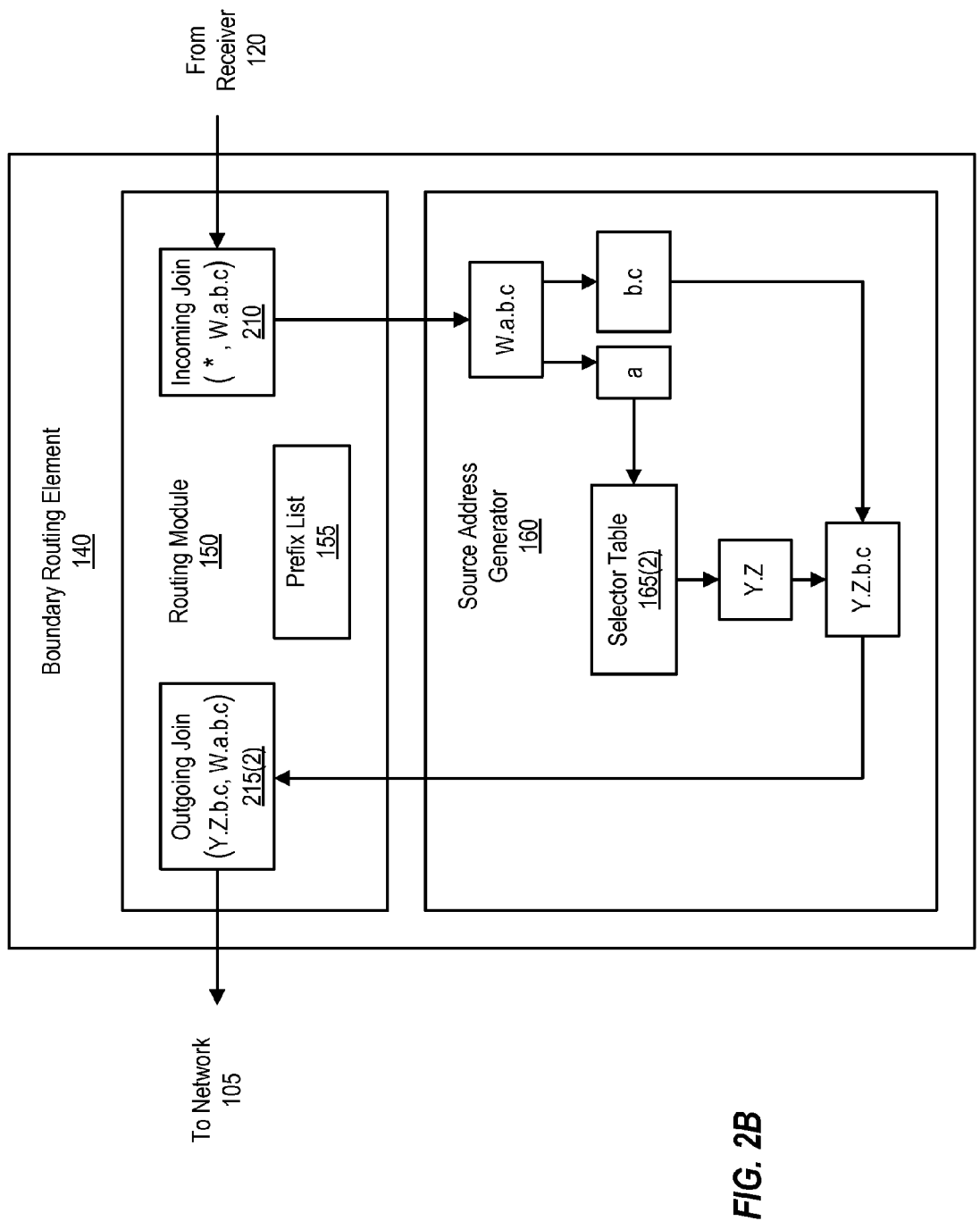

FIG. 2B is a block diagram illustrating components of an example boundary routing element 140, which can be configured with routing module 150 and source address generator 160. In the embodiment shown, source address generator 160 is further configured to use selector table 165(2) in performing source address generation.

FIG. 2B illustrates a scenario where multicast group address G matches a prefix in prefix list 155. As similarly discussed above with respect to FIG. 2A, routing module 150 provides multicast group address G to source address generator 160 to generate a corresponding source address S. In particular, source address generator 160 can be configured (e.g., by a network provider) to assign one or more pre-configured octet values to one or more higher order octets of source address S, and to assign one or more lower order octets of a group address to one or more lower order octets of source address S. Upon receipt of multicast group address G, source address generator 160 can be configured to combine the pre-configured octet value(s) with octet(s) of G according to the configured octet assignment. In the embodiment shown, source address generator 160 is configured to combine pre-configured octet value Y.Z (which are assigned to the two higher order octets of source address S) with the two lower order octets of multicast group address G (which are assigned to the two lower order octets of source address S) to produce a source address S of Y.Z.b.c.

In one embodiment, source address generator 160 can be configured to combine pre-configured octet value(s) with octet(s) of G by writing the pre-configured octet value(s) (e.g., Y.Z) to the assigned highest order octet(s) of a new (null) address, and write the octet(s) of G (e.g., b.c) to the assigned lowest order octet(s) of the new address, thus producing a generated source address S (e.g., Y.Z.b.c). In another embodiment, source address generator 160 can be configured to combine the pre-configured octet value(s) with octet(s) of G by first masking G to produce an intermediate address value that includes the lowest order octet(s) of multicast group address G, where the lowest order octet(s) are assigned to the lowest order octet(s) of source address S. For example, G can be masked to produce 0.0.b.c (e.g., by performing a bitwise AND operation of G and a mask of 0.0.255.255). Source address generator 160 can then be configured to replace the highest order octet(s) of the intermediate address with the pre-configured octet value(s) to produce the source address S. For example, Y.Z can replace the highest order octets, 0.0, of intermediate address 0.0.b.c (e.g., by writing Y.Z into the highest order octets of intermediate address 0.0.b.c, or by performing a bitwise OR operation of Y.Z.0.0 and 0.0.b.c) to produce source address Y.Z.b.c.

In the embodiment shown, various pre-configured octet values can be stored in entries of selector table 165(2), where higher order octet(s) of multicast group address G can be used to select a particular pre-configured octet value(s) from selector table 165(2). For example, the second highest order octet, a, of multicast group address G can be used as a selector to select pre-configured octet values Y.Z from selector table 165(2). Selector table 165(2) is further discussed below, in reference to FIG. 4B.

The examples provided herein (e.g., examples illustrated in FIGS. 2A and 2B) are not limiting, and other octet assignments can be implemented to generate a source address.

FIG. 3 is a block diagram illustrating elements of an example prefix list 155 configured on boundary routing element 140. Prefix list 155 includes multiple prefix entries 310, where each prefix entry includes a designated prefix 315. Each designated prefix 315 identifies a range of group addresses that are mapped to source addresses. A mapped group address can be used to generate a corresponding source address. Thus, a multicast group address of a received join request that matches one of the prefixes 315 in prefix list 155 is identified as a group address that maps to a corresponding source address.

A prefix of an IP address can be represented as a dotted-decimal address followed by a slash and a prefix length, such as a.b.c.d\n for an IPv4 address. The prefix length, n, indicates the number of initial bits of the dotted decimal address, counting from the most-significant bit of the address, occupied by the prefix. Thus, a prefix length of 8 indicates a designated prefix uses the 8 most significant bits of the address. The example prefix length of 8 is used herein to indicate a prefix occupying a highest order octet of an address. The examples used herein are not limiting; other prefix lengths can be used for prefixes (for IPv4 or IPv6 addresses).

Routing module 150 can be configured to compare initial bits of a multicast group address G received in a join request to one or more designated prefixes in prefix list 155. Routing module 150 can compare a number of initial bits (e.g., most significant bits) of G to a designated prefix, as specified by the prefix length of the entry. For example, if the prefix length of a designated prefix is 8, routing module 150 can compare the initial 8 bits of G to the designated prefix. If the initial bits of the multicast group address match the designated prefix, then the multicast group address is identified as a mapped group address.

Routing module 150 can be configured to compare G to the designated prefixes of prefix list 155, in sequential entry order. For example, if G does not match the designated prefix of an initial or first entry of prefix list 155, routing module 150 can move to the next sequential entry in prefix list 155, and compare G to the designated prefix of the next entry. In the embodiment shown, prefix list 155 includes three example designated prefixes: 232.0.0.0\8, 234.0.0.0\8 and W.0.0.0\8.

Routing module 150 can be configured to compare initial bits of G to the designated prefix of first entry 310(1) of prefix list 155. Since the prefix length of the first entry is 8, routing module 150 can be configured to compare the first 8 bits, or highest order octet, of G to the designated prefix of entry 310(1). If the highest order octet of G is octet value W (as illustrated in FIGS. 2A and 2B), routing module 150 can determine that G does not match the designated prefix of entry 310(1) (e.g., W does not match 232). In response, routing module 150 can move on to the next entry, entry 310(2), and compare G to the designated prefix of entry 310(2). In such a manner, routing module 150 can compare G to the designated prefixes of prefix list 155 in entry order.

If routing module 150 has compared G to all entries without a match (e.g., has reached the end of prefix list 155 and G does not match any prefix of prefix list 155), then G is not identified as a mapped group address. In response to no matches, routing module 150 can perform normal join request processing.

If G matches a prefix of prefix list 155, then G is identified as a mapped group address. In response to the match, routing module 150 stops comparing G to prefix list 155 and provides the multicast group address G to source address generator 160 for generation of a corresponding source address. In the embodiment shown, routing module 150 can be configured to provide G to source address generator 160 upon determining that the initial bits of G (e.g., the highest order octet) matches a designated prefix in prefix list 155 (e.g., matches the designated prefix W.0.0.0/8 of entry 310(3)). Source address generation is further discussed below in reference to FIG. 6.

The designated prefixes in prefix list 155 can be configured on routing module 150 by a network provider. Any particular designated prefix can be configured in prefix list 155 (illustrated by the prefix W.0.0.0/8), but IANA (Internet Assigned Numbers Authority) address ranges can also be used. For example, the block of addresses in the range 232.0.0.0/8 is reserved for source specific multicast (SSM). A network provider can configure this range as a designated prefix 232.0.0.0/8. Thus, the prefix 232/8 can be used by a receiver to indicate to routing module 150 that the receiver wishes to join a particular channel, even if the receiver is not configured to implement SSM (e.g., receiver wishes to use an SSM service that maps a group address to a source address). Thus, a group address that falls within the SSM range can be identified as a mapped group address and can be used to generate a corresponding source address.

A block of addresses can also be expressly reserved by IANA for such an SSM service, such as an example range 234.0.0.0/8 (where a group address that falls within the example range can be identified as a mapped group address and can be used to generate a corresponding source address). An expressly reserved address block for the SSM service described herein can automatically differentiate receivers that are and are not configured with SSM, which can be handled appropriately by routing module 150 (e.g., by respectively performing normal join request processing or performing alternative join request processing described herein).

FIG. 4A is a block diagram illustrating elements of an example selector table configured on boundary routing element 140. Selector table 165(1) includes multiple table entries 400, where each table entry includes a group address selector octet 410 and a corresponding source address higher order octet 420. In one embodiment, source address higher order octet 420 is a network address used in network 105, further discussed below with reference to FIG. 4B.

Selector table 165(1) can be keyed to group address selector octet 410, where a higher order octet of multicast group address G can be used as a selector to select an entry 400 of selector table 165(1). Selection of an entry 400 indicates that the corresponding source address higher order octet 420, which is a set of one or more octet values, will be incorporated in a generated source address S. For example, a selector (e.g., W) that matches group address selector octet 410 of an entry (e.g., entry 400(3)) indicates that the corresponding source address higher order octet 420 (e.g., X) of the entry is used as the highest order octet of a generated source address S, according to a configured octet assignment. Group address selector octet 410 can also be a set of one or more octets (rather than a single octet), where multiple octets of group address G can be used as a selector into selector table 165(1). Using one octet as a selector can provide 255 different selector table entries, and thus 255 possible sets of higher order octets 420. Using more than one octet as a selector can provide additional selector table entries, where the selector octets can be used to create a hierarchy of possible sets of higher order octets 420.

FIG. 4B is another block diagram illustrating elements of an example selector table configured on boundary routing element 140. Selector table 165(2) includes multiple table entries 430, where each table entry includes a group address selector octet 440 and a corresponding source address higher order octets 450.

Selector table 165(2) can similarly be keyed to group address selector octet 440, where a higher order octet of multicast group address G can be used as a selector to select an entry 430 of selector table 165(2). Selection of an entry 430 indicates that the corresponding source address higher order octet 450, which is a set of one or more octet values, will be incorporated in a generated source address S. For example, a selector (e.g., a) that matches group address selector octet 440 of an entry (e.g., entry 430(1)) indicates that the corresponding source address higher order octet 450 (e.g., Y.Z) of the entry is used as the highest order octets of a generated source address S, according to a configured octet assignment. Group address selector octet 440 can also be a set of one or more octets (rather than a single octet), where multiple octets of group address G can be used as a selector into selector table 165(2).

Source address higher order octets 450 of an entry 430 can include a set of one or more octets (e.g., 1 to 4 for IPv4 addresses, or 1 to 16 for IPv6 addresses) that are used as the higher order octets of a source address S. Source address higher order octets 450 can also include a set of a variable number of octets that varies from entry to entry in selector table 165(2) (e.g., some entries may include sets of two octet values, while other entries may include sets of 3 octet values). In such cases, different assignments can be configured for the different sets of octet values, where the remaining lower order octets of the source address S that are not occupied by the source address higher order octets 450 (e.g., the set of a variable number of octets) are occupied by corresponding lower order octets of group address G.

In one embodiment, source address higher order octets 450 form a network address used in network 105. Since a network provider very likely uses the same major network address (e.g., the most significant bits of an IP address that identify the network) in all source addresses of sources owned by the network provider, the highest order octet(s) of a generated source address can be allocated with the network address. In other words, a corresponding source address can be generated in such an embodiment by effectively taking the multicast group address and swapping out the highest order octet(s) of the multicast group address (e.g., the IANA defined range for multicast) with the network address. For example, a network provider can allocate a source address of X.a.b.c to source A 110(1), and a corresponding multicast group address of W.a.b.c to a multicast group. The highest order octet, W, of the multicast group address can be an IANA multicast range, such as 224 or 232. The highest order octet, X, of the source address can be a network address, such as 10 (e.g., a private network address).

Figure 5:
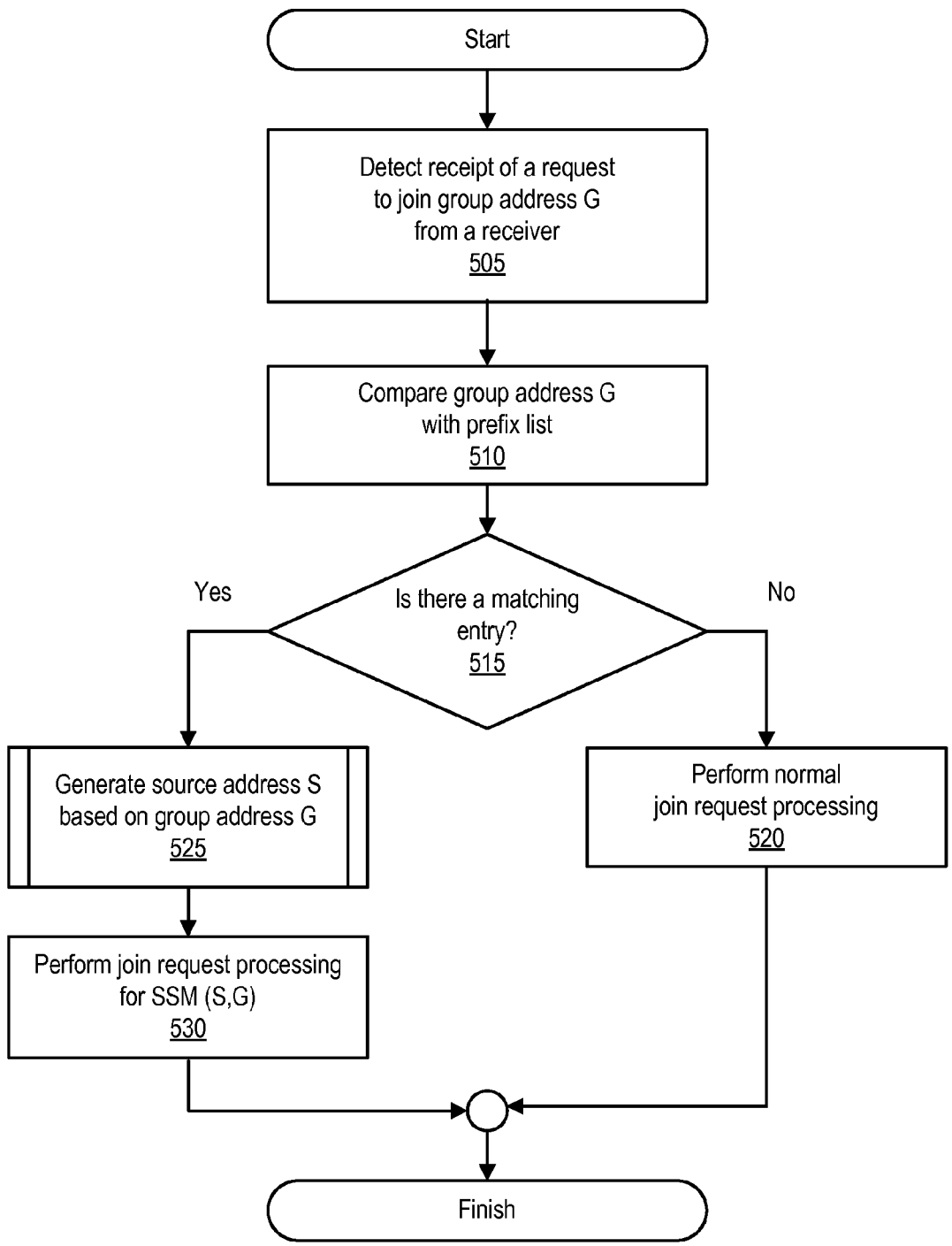
FIG. 5 is a flowchart illustrating acts of an example process implemented by a routing module configured on a boundary routing element, according to one embodiment.

FIG. 5 is a flowchart illustrating acts of an example process implemented by routing module 150 that is configured on boundary routing element 140. The process can be implemented each time a join request is received from a receiver.

The process illustrated in FIG. 5 begins at operation 505, where routing module 150 detects receipt of a request to join a group address G from a receiver. For example, a request to join a group address G can be an IGMP membership report sent from receiver 120 to boundary routing element 140. The join request can be received on a port of boundary routing element 140 that is communicatively coupled to receiver 120, where the received join request can be internally forwarded to (and thus received by) routing module 150.

The process continues to operation 510, where routing module 150 compares group address G of the received join request with a prefix list 155. As discussed above, prefix list 155 includes one or more prefix entries. Each prefix in prefix list 155 identifies a range of group addresses that are mapped to source addresses, where each of the mapped group addresses can be used to generate a corresponding source address. Routing module 150 compares initial bits (e.g., most significant bits) of the group address G to the prefix entries in prefix list 155, in entry order (e.g., beginning with the first entry and comparing G to each consecutive entry until a match is found). The process continues to operation 515, where routing module 150 determines whether G matches one of the entries of the prefix list.

If G does not match any entries in prefix list 155 (e.g., the initial bits of G do not match any prefix in prefix list 155), then G is not a mapped group address and the process continues to operation 520, performing normal join request processing. For example, routing module 150 can perform normal join request processing of an incoming join request (e.g., a IGMP membership report), which can include creating multicast state for (*, G), generating a corresponding join message (e.g., a PIM join message) in response to receiving the incoming join request, and transmitting the corresponding join message to the network (e.g., to a core rouging element in the network). Thus, routing module 150 can be configured to process incoming join requests that include a mapped group address in one manner (e.g., perform source address generation), and process incoming join requests that do not include a mapped group address in another manner (e.g., perform normal join request processing of a join request, which may include both an identified source address and multicast group address). The process then ends.

Returning to operation 515, if G matches an entry in prefix list 155 (e.g., the initial bits of G match a prefix in a prefix entry of prefix list 155), then G is identified as a mapped group address that can be used to generate a corresponding source address, and the process continues to operation 525, generating source address S based on group address G. Routing module 150 is configured to provide group address G to source address generator 160, which generates source address S. Source address generation is further discussed below, in reference to FIG. 6.

The process continues to operation 530, where routing module 150 performs join request processing as if the incoming join request was an SSM join request that included the tuple (S, G). For example, operation 530 can include creating multicast state for (S, G), generating a corresponding join message for the tuple (S, G) and transmitting the corresponding join message to the network (e.g., to a core rouging element in the network). For example, the join message can be a PIM join message transmitted from a port of boundary routing element 140 that is communicatively coupled to core routing element 130 in network 105. The process then ends.

Figure 6:
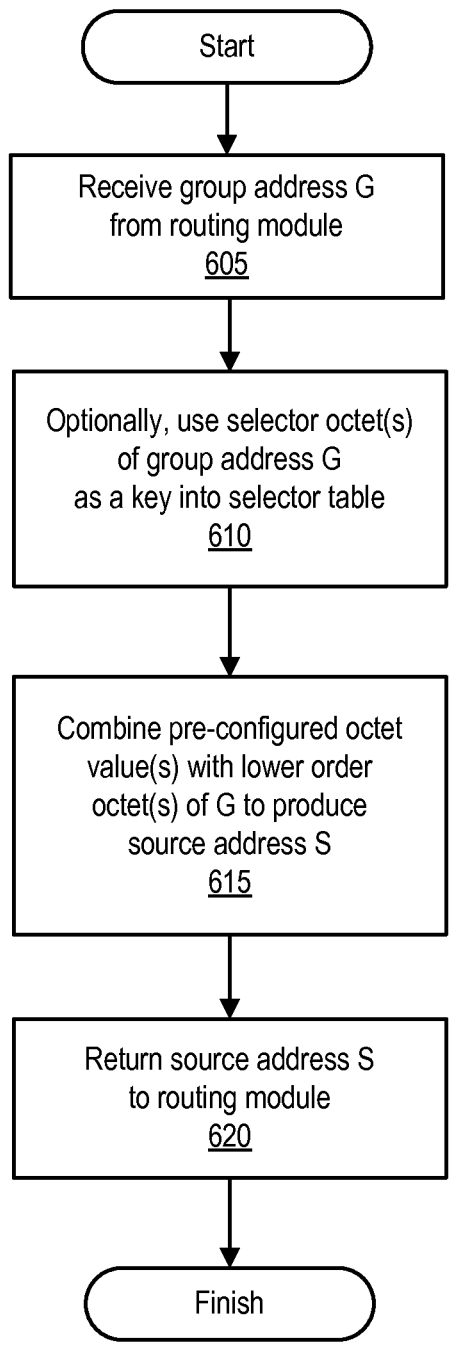
FIG. 6 is flowchart illustrating acts of an example source address generation process implemented by a source address generator configured on a routing element, according to one embodiment.

FIG. 6 is a flowchart illustrating acts of an example source address generation process implemented by source address generator 160 that is configured on boundary routing element 140. The process in FIG. 6 can be implemented each time generation of a source address is required (e.g., operation 525 of FIG. 5).

The process for generating a source address S begins at operation 605, where source address generator 160 receives group address G from routing module 150. The process continues to operation 610, where one or more octets of group address G can be used as selector octet(s) into a selector table to select an entry. The selected entry corresponds to one or more pre-configured octet values. Operation 610 is optional and can be skipped if selector table 165 is not implemented. If selector table 165 is not implemented, one or more static pre-configured octet values can be configured on routing module 150.

The process continues to operation 615, where source address generator 160 combines pre-configured octet value(s) with lower order octet(s) of G to produce a source address S, according to a configured octet assignment. As discussed above, one or more pre-configured octet values are assigned to one or more higher order octets of source address S. For example, an octet assignment configured on source address generator 160 can provide that a set of one or more pre-configured octet values (e.g., static values or values that have been selected from selector table 165) are assigned to one or more higher order octets of source address S. An octet assignment can also provide that one or more lower order octets of group address G are assigned to one or more lower order octets of source address S. The process continues to operation 630, where source address generator 160 returns source address S to routing module 150. The process then ends.

Figure 7:
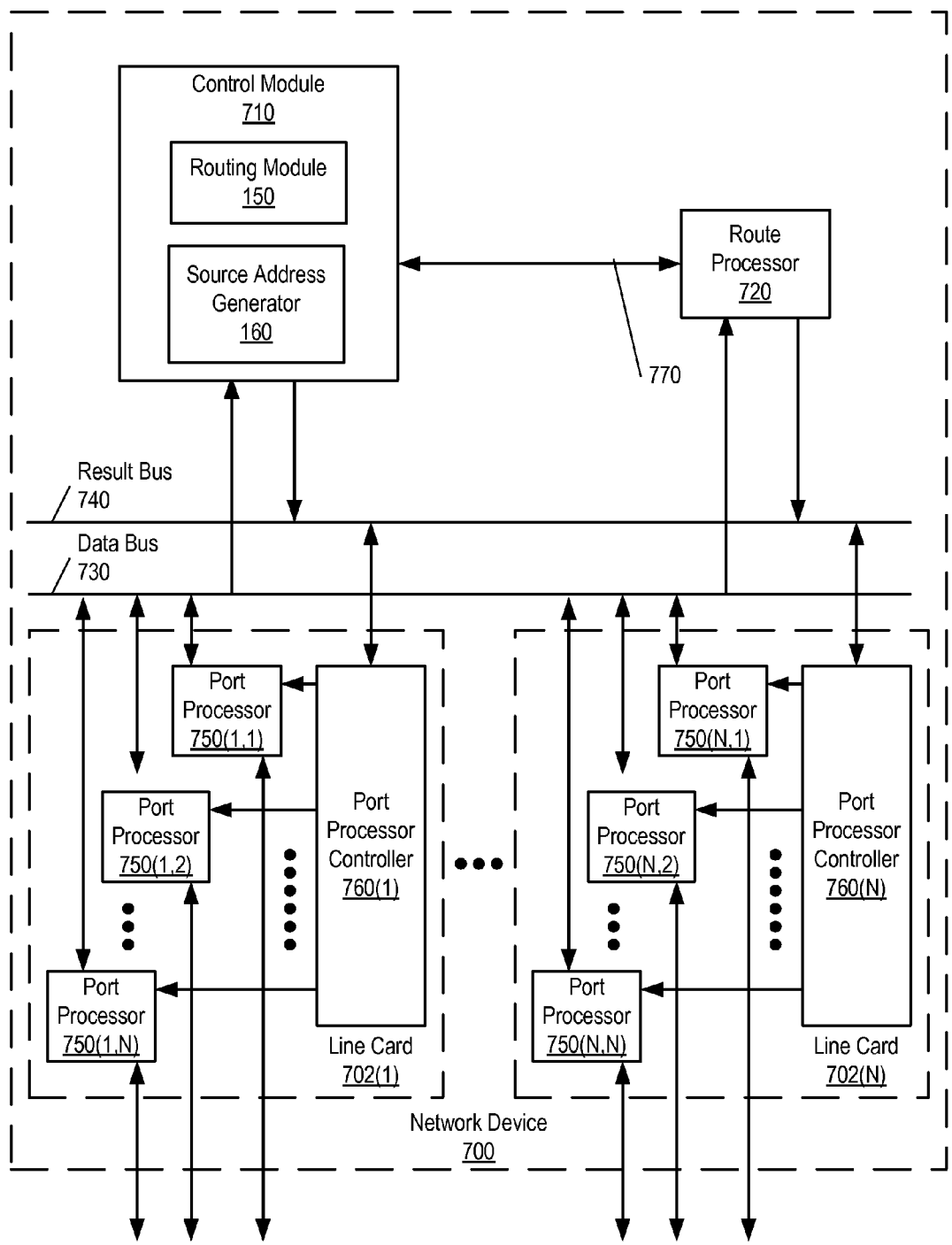
FIG. 7 is a block diagram illustrating components of an example network device in which the present disclosure can be implemented, according to one embodiment.

FIG. 7 is a block diagram illustrating relevant components of an example network device 700 configured as a boundary routing device (e.g., boundary routing elements 140(1) and 140(2) of FIG. 1). In this depiction, network device 700 includes a number of line cards (line cards 702(1)-702(N)) that are communicatively coupled to a control module 710 (which can include a forwarding engine, not shown) and a route processor 720 via a data bus 730 and a result bus 740. Line cards 702(1)-(N) include a number of port processors 750(1,1)-750(N,N) which are controlled by port processor controllers 760(1)-760(N). It will also be noted that control module 710 and route processor 720 are not only coupled to one another via data bus 730 and result bus 740, but are also communicatively coupled to one another by a communications link 770. It is noted that in alternative embodiments, each line card can include its own forwarding engine.

When a message (e.g., an IGMP membership report or other receiver join message) is received (e.g., received from network 105), the message is identified and analyzed by a network device such as network device 700 in the following manner. Upon receipt, a message (or some or all of its control information) is sent from one of the port processors 750(1,1)-750(N,N) at which the message was received (e.g., received from receiver 120) to one or more of those devices coupled to data bus 730 (e.g., others of port processors 750(1,1)-750(N,N), a forwarding engine, and/or route processor 720). Handling of the message can be determined, for example, by a forwarding engine. For example, a forwarding engine may determine that the message should be forwarded to one or more of port processors 750(1,1)-750(N,N). This can be accomplished by indicating to corresponding one(s) of port processor controllers 760(1)-760(N) that the copy of the message held in the given one(s) of port processors 750(1,1)-750(N,N) should be forwarded to the appropriate one of port processors 750(1,1)-750(N,N).

Network device 700 can implement routing module 150 and a source address generator 160 (e.g., in control module 710, as shown, or in one of port processor controllers 760(1)-760(N) and/or in route processor 720) in order to implement the present disclosure. Network device 700 can also implement a prefix list 155 and a selector table 165 (e.g., in control module 710, in one of port processor controllers 760(1)-760(N) and/or in route processor 720, not shown). An incoming message can be provided to routing module 150 via a forwarding engine or port processor of a line card coupled to a port that received the incoming message. Routing module 150 can be configured to generate an outgoing message (e.g., a PIM join message or other join message) in response to the incoming message (e.g., an IGMP membership report or other receiver join message). The outgoing message can include a source address generated by source address generator 160. Routing module 150 can provide the outgoing message to a forwarding engine, which can determine that the outgoing message should be forwarded to one or more of port processors 750(1,1)-750(N,N), which can transmit the outgoing message (e.g., transmitted to network 105). Network device 700 can thus implement one or more of the methods illustrated FIGS. 5 and 6 using routing module 150, prefix list 155, source address generator 160, and/or selector table 165.

Figure 8:
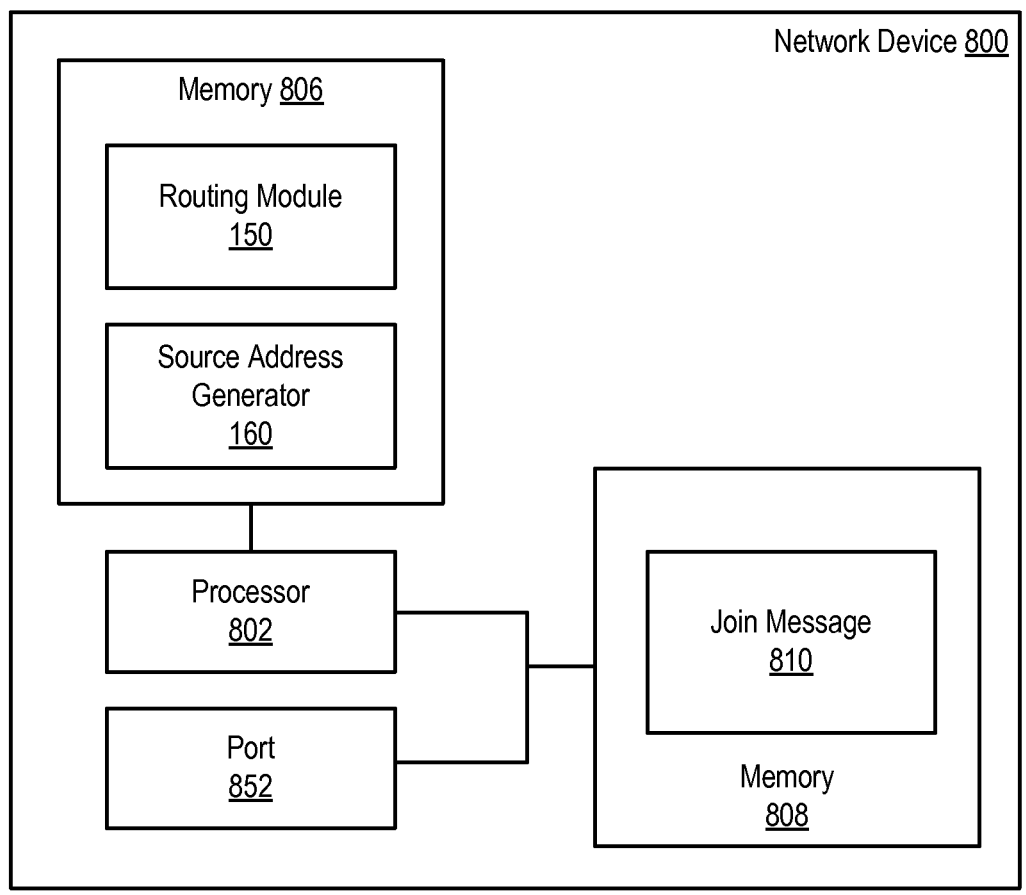
FIG. 8 is a block diagram illustrating components of an example network device in which the present disclosure can be implemented, according to one embodiment.

FIG. 8 is a block diagram illustrating relevant components of an example network device 700, in which the network device is configured as a boundary routing device (e.g., boundary routing elements 140(1) and 140(2) of FIG. 1). As illustrated, network device 700 includes one or more processors 802 (e.g., microprocessors, PLDs (Programmable Logic Devices), or ASICs (Application Specific Integrated Circuits)) configured to execute program instructions stored in memories 806 and/or 808, which are computer readable storage media. Memories 806 and 808 can include various types of RAM (Random Access Memory), ROM (Read Only Memory), Flash memory, MEMS (Micro Electro-Mechanical Systems) memory, and the like. Network device 700 also includes one or more ports 852 (e.g., one or more hardware ports or other network interfaces that can be linked to other network devices, hosts, servers, storage devices, or the like). Processor 802, port 852, and memories 806 and 808 are coupled to send and receive data and control signals by one or more buses or other interconnects.

In this example, program instructions executable to implement a routing module 150 and/or a source address generator 160 are stored in memory 806. Routing module 150 includes the functionality needed to generate a join message (e.g., to perform the method illustrated in FIG. 5). Source address generator 160 includes the functionality needed to generate a source address (e.g., to perform one of the methods illustrated in FIG. 6). Prefix list 155 and/or selector table 165 can also be stored in memory 806. Prefix list 155 can alternatively be implemented as part of an access control list configured on network device 800. Join message 810, such as an incoming join message 210 and/or an outgoing join message 215, can be stored in memory 808. In one embodiment, join message 810 can be received from port 852 that is coupled to receiver 120, and can be stored in memory 808 before being provided to routing module 150 for processing. In another embodiment, join message 810 can be generated by routing module 150, and can be stored in memory 808 before being transmitted via port 852 that is coupled to network 105.

Although the present disclosure has been described with respect to specific embodiments thereof, various changes and modifications may be suggested to one skilled in the art. It is intended such changes and modifications fall within the scope of the appended claims.

What is claimed is:

1. A method comprising:
receiving a join request from a receiving device, wherein
the join request comprises a group address partitioned into one or more octets;
determining whether the group address requires source address generation by comparing at least a portion of the group address with one or more entries in a prefix list;
in response to the at least a portion of the group address matching an entry in the prefix list, generating a source address, wherein
the group address is used to generate the source address by combining one or more pre-configured octet values with the one or more octets of the group address according to an octet assignment, and
the octet assignment assigns the one or more pre-configured octet values to a first portion of the source address, and the octet assignment assigns the one or more octets of the group address to a second portion of the source address; and
upon producing the source address
generating an outgoing loin message, wherein the outgoing join message comprises the source address and the group address, and
performing source specific multicast processing using the source address and the group address, wherein
a source corresponding to the source address is configured to provide a datastream to the group address on a channel,
the source address and the group address together uniquely identify the channel, and
the performing the specific source multicast processing comprises transmitting the outgoing loin message to a network element.

2. The method of claim 1, further comprising:
selecting the one or more pre-configured octet values from a selector table,
wherein at least one octet of the group address is used to select the one or more pre-configured octet values.

3. The method of claim 1, wherein the group address is a source specific multicast group address.

4. The method of claim 1, wherein the receiving device does not support source specific multicast.

5. The method of claim 1, wherein the join request does not comprise information identifying a source.

6. The method of claim 1, further comprising: in response to a determination that the group address does not require source address generation, generating an outgoing join request without generating the source address.

7. A boundary routing element comprising:
a memory device configured to store program instructions;
a processor coupled to the memory device configured to execute the program instructions;
a port, wherein the port receives a join request from a receiving device, and the join request comprises a group address partitioned into one or more octets;
a routing module, executable by the processor, wherein
the routing module determines whether the group address requires source address generation by comparing at least a portion of the group address with one or more entries in a prefix list; and
a source address generator, executable by the processor, and configured to, in response to the at least a portion of the group address matching an entry in the prefix list, generate a source address, wherein
the group address is used to generate the source address by combining one or more pre-configured octet values with the one or more octets of the group address according to an octet assignment,
the octet assignment assigns the one or more pre-configured octet values to a first portion of the source address, and the octet assignment assigns the one or more octets of the group address to a second portion of the source address, and generating the source address enables the routing module to:
generate an outgoing join message, wherein
the outgoing join message comprises the source address and the group address, and
perform source specific multicast processing using the source address and the group address wherein
a source corresponding to the source address is configured to provide a datastream to the group address on a channel,
the source address and the group address together uniquely identify the channel, and
performing the specific source multicast processing comprises transmitting the outgoing join message to a network element.

8. The boundary routing element of claim 7, wherein the source address generator selects the one or more pre-configured octet values from a selector table, wherein at least one octet of the group address is used to select the one or more pre-configured octet values.

9. The boundary routing element of claim 7, wherein the loin request received by the port does not comprise information identifying a source.

10. The boundary routing element of claim 7, wherein in response to a determination by the routing module that the group address does not require source address generation, generating an outgoing loin request without generating the source address.

11. The boundary routing element of claim 7, wherein the group address is a source specific multicast address.

12. The boundary routing element of claim 7, wherein the receiving device does not support source specific multicast.

13. A non-transitory computer readable storage medium configured to store program instructions that, when executed on a processor, are configured to cause the processor to perform a method comprising:
receiving a join request from a receiving device, wherein
the join request comprises a group address partitioned into one or more octets;
determining whether the group address requires source address generation by comparing at least a portion of the group address with one or more entries in a prefix list; and
in response to the group address matching an entry in the prefix list, generating a source address, wherein
the group address is used to generate the source address by combining one or more pre-configured octet values with the one or more octets of the group address according to an octet assignment, and the octet assignment assigns the one or more pre-configured octet values to a first portion of the source address, and the octet assignment assigns the one or more octets of the group address to a second portion of the source address; and upon producing the source address generating an outgoing join message, wherein
the outgoing join message comprises the source address and the group address, and performing source specific multicast processing using the source address and the group address wherein a source corresponding to the source address is configured to provide a datastream to the group address on a channel, the source address and the group address together uniquely identify the channel, and the performing the specific source multicast processing comprises transmitting the outgoing join message to a network element.

14. The non-transitory computer readable storage medium of claim 13, wherein the method further comprises:
selecting the one or more pre-configured octet values from a selector table, wherein
at least one octet of the group address is used to select the one or more pre-configured octet values.

15. The non-transitory computer readable storage medium of claim 13, wherein the method further comprises wherein the loin request does not comprise information identifying a source.

16. The non-transitory computer readable storage medium of claim 13, wherein the method further comprises in response to a determination that the group address does not require source address generation, generating an outgoing loin request without generating the source address.

17. The non-transitory computer readable storage medium of claim 13, wherein the method further comprises wherein the group address is a source specific multicast address.

18. The non-transitory computer readable storage medium of claim 13, wherein the receiving device does not support source specific multicast.

\* \* \* \* \*